United States Patent
Koontz et al.

(10) Patent No.: US 8,850,920 B2
(45) Date of Patent: Oct. 7, 2014

(54) ADJUSTMENT DEVICE FOR A REMOTE CONTROL ASSEMBLY HAVING AN EASILY ENGAGEABLE AND DISENGAGEABLE LOCKING ELEMENT

(75) Inventors: Harry Edward Koontz, Troy, MI (US); John William Harrison, Goodrich, MI (US); Joseph Matthew Laperriere, III, Chesterfield, MI (US)

(73) Assignee: Kongsberg Driveline Systems I, Inc., Troy, MI (US)

( * ) Notice: Subject to any disclaimer, the term of this patent is extended or adjusted under 35 U.S.C. 154(b) by 940 days.

(21) Appl. No.: 12/249,650

(22) Filed: Oct. 10, 2008

(65) Prior Publication Data

US 2010/0089195 A1    Apr. 15, 2010

(51) Int. Cl.
*F16C 1/14*    (2006.01)
*F16C 1/22*    (2006.01)

(52) U.S. Cl.
CPC .. *F16C 1/223* (2013.01); *F16C 1/14* (2013.01)
USPC ....................................................... 74/502.4

(58) Field of Classification Search
USPC ........ 74/500.5, 501.5 R, 501.6, 502.4, 502.6;
403/321, 322.1, 328, 109.2, 109.1,
403/108, 104, 105, 327, 379.2
See application file for complete search history.

(56) References Cited

U.S. PATENT DOCUMENTS

| | | | |
|---|---|---|---|
| 3,572,159 A * | 3/1971 | Tschanz ........................ | 74/502.5 |
| 4,177,691 A * | 12/1979 | Fillmore ...................... | 74/502.4 |
| 4,805,479 A | 2/1989 | Brightwell | |
| 4,887,930 A | 12/1989 | Chaczyk et al. | |
| 4,889,006 A * | 12/1989 | Kolinske et al. ............. | 74/502.4 |
| 5,161,428 A | 11/1992 | Petruccello | |
| 5,163,338 A | 11/1992 | Sharp et al. | |
| 5,207,116 A | 5/1993 | Sultze | |
| 5,394,770 A | 3/1995 | Boike et al. | |
| 5,435,202 A | 7/1995 | Kitamura | |
| 5,598,743 A | 2/1997 | Yasuda | |
| 5,605,074 A | 2/1997 | Hall et al. | |
| 5,632,182 A | 5/1997 | Reasoner | |
| 5,682,797 A | 11/1997 | Kelley et al. | |
| 6,116,111 A | 9/2000 | Burger | |
| 6,595,080 B2 | 7/2003 | Waldow et al. | |
| RE39,327 E * | 10/2006 | Reasoner ..................... | 74/502.4 |
| 7,146,875 B2 | 12/2006 | Gordy et al. | |

FOREIGN PATENT DOCUMENTS

EP    0859158    8/1998
EP    2019216 A2    1/2009

OTHER PUBLICATIONS

European Publication No. 2019216 and English language Abstract of European Publication No. 2019216 from the European Patent Office; 18 pages.

* cited by examiner

*Primary Examiner* — Thomas Diaz
(74) *Attorney, Agent, or Firm* — Howard & Howard Attorneys PLLC

(57) ABSTRACT

A remote control assembly having a conduit and a core element slidably disposed in the conduit. An adjustment device is selectively connected to one of the conduit and the core element for adjusting an effective length thereof. The adjustment device includes an adjustment housing and a slider. A locking element, having locking teeth, engages with slider teeth of the slider. The locking element defines a cavity for allowing insertion of a tool to facilitate movement of the locking element from a locked position to an unlocked position. Also, a cover is slidably supported on the housing and the cover includes a detent to further facilitate movement of the locking element.

20 Claims, 5 Drawing Sheets

ADJUSTMENT DEVICE FOR A REMOTE CONTROL ASSEMBLY HAVING AN EASILY ENGAGEABLE AND DISENGAGEABLE LOCKING ELEMENT

BACKGROUND OF THE INVENTION

1. Field of the Invention

The subject invention relates to motion transmitting remote control assemblies having adjustment devices for adjusting an effective length of a conduit or a core element. More specifically, the invention relates to a locking element of the adjustment device.

2. Description of Related Art

Adjustment devices for remote control assemblies are well known in the art. Some adjustment devices are used to adjust an effective length of a conduit, such as disclosed in U.S. Pat. No. 5,682,797, and others are used to adjust an effective length of a core element, such as disclosed in U.S. Pat. No. 5,394,770. In either case, a locking element is typically employed. The locking element often includes a set of teeth that selectively engage a set of teeth on either the conduit or the core element. Hence, the locking element can move between a locked position interengaging the teeth to no longer allow relative movement between the conduit/core element and the adjustment device and an unlocked position disengaging the teeth and allowing relative movement between the conduit/core element and the adjustment device.

The operation of moving the locking element from the unlocked position to the locked or engaged position is often performed manually. In certain circumstances, it can be difficult to move the locking element, especially in areas with limited access. Also, it can be difficult for the installer to verify full engagement of the locking element.

At times it may be necessary to move the locking element from the locked position back to the unlocked position. This is typically performed during servicing or maintenance of the remote control assembly. Many of the prior art locking elements, once moved to the locked position, are difficult to subsequently move back to the unlocked position, which can result in damage of the locking element and/or adjustment device. This issue is amplified if the remote control assembly is installed in an area with limited access.

Accordingly, there remains a need in the industry to develop an adjustment device with a locking element where full engagement of the locking element can be easily performed and verified and that the locking element can be efficiently moved back to an unlocked position for servicing.

SUMMARY OF THE INVENTION AND ADVANTAGES

A motion transmitting remote control assembly for transmitting motion along a path. The remote control assembly comprises a conduit and a motion-transmitting core element slidably disposed in the conduit. The remote control assembly also includes an adjustment device selectively connected to one of the conduit and the core element for adjusting an effective length thereof. The adjustment device includes an adjustment housing having a first opening and a second opening intersecting the first opening. A slider having slider teeth is slidably disposed in the first opening. A locking element having a body with a top and locking teeth extending toward the second opening away from the top engages with the slider teeth. The locking element is movably disposed in the second opening between a locked position with the locking teeth engaging the slider teeth and an unlocked position with the locking teeth disengaging the slider teeth. The locking element defines a cavity between the top and the locking teeth for allowing insertion of a tool to facilitate movement of the locking element from the locked position to the unlocked position.

In addition or alternatively, a cover can be slidably supported on the housing with the cover movable about the housing between an open position spaced from the second opening and a closed position extending at least partially over the second opening when the locking element is in the locked position for at least partially covering the locking element. A notch can be formed in the top of the locking element and a detent can be formed in the cover aligned with the notch for allowing insertion of a tool to facilitate movement of the locking element from the locked position to the unlocked position. In this arrangement, the cavity may be eliminated.

Accordingly, the remote control assembly of the subject invention includes an adjustment device having a locking element that can be efficiently moved from the locked position to the unlocked position for servicing. Further, full engagement of the locking element is easily verified through the use of the cover. In addition, the locking element is movable between locked and unlocked positions without undue interference to provide easier operation by a user.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION OF THE INVENTION

Figure 1:
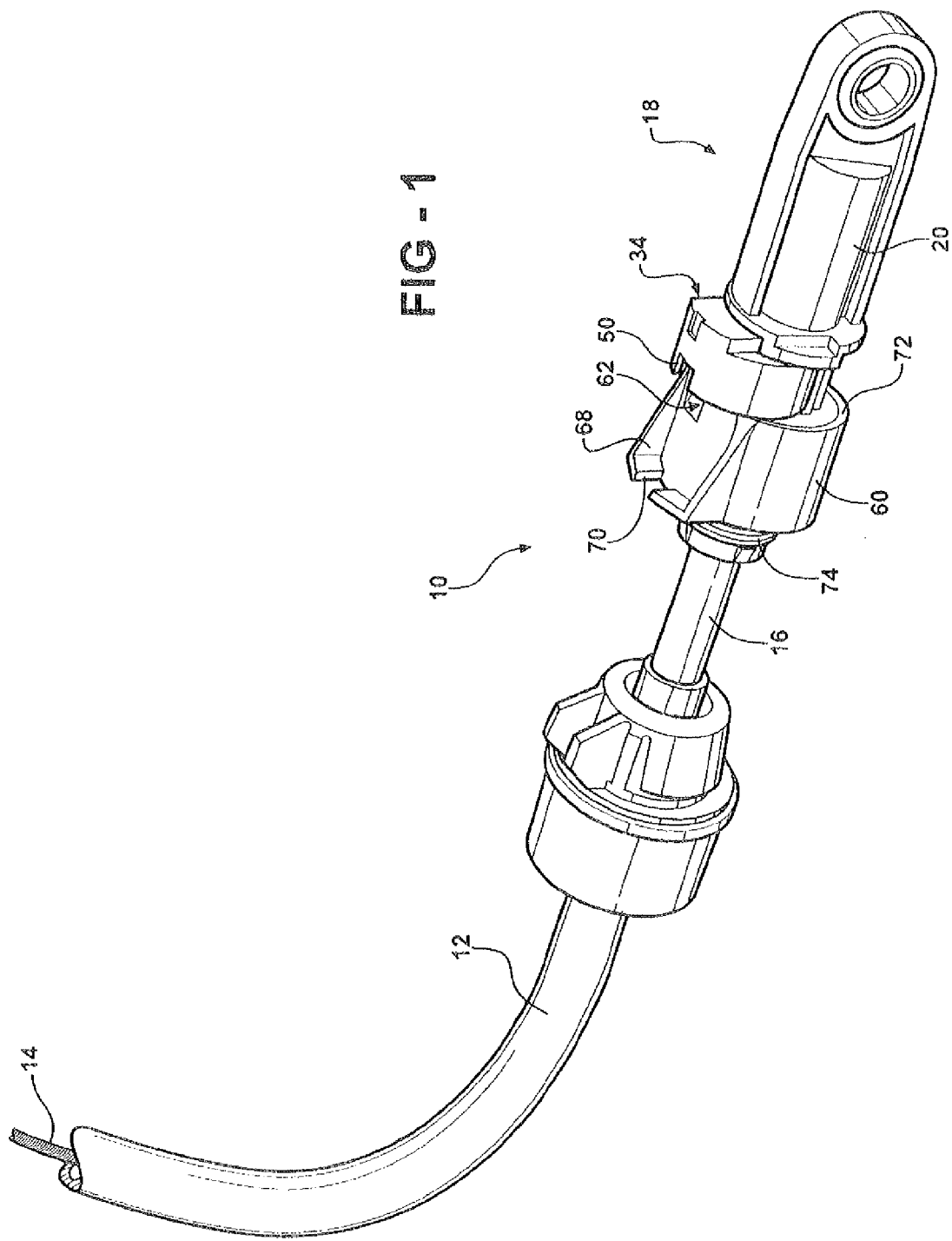
FIG. 1 is a perspective view of a remote control assembly having an adjustment device in accordance with the subject invention with a locking element in an unlocked position and a cover in an open position.

Referring to the Figures, wherein like numerals indicate like or corresponding parts throughout the several views, a motion transmitting remote control assembly for transmitting motion along a path is generally shown at 10 in FIG. 1. The remote control assembly 10 includes a conduit 12 and a motion-transmitting core element 14 slidably disposed in the conduit 12. The conduit 12 and core element 14 may be of any suitable design or configuration as known in the art. Also, there may be additional components, such as the swivel tube device shown, that may be mounted and/or disposed on or about the conduit 12. The core element 14 has a rigid tubular rod 16 secured to one end by conventional means, such as crimping, welding or soldering. As known to those skilled in the art, the assembly 10 is connected at one end to a device to be remotely controlled, such as a vehicle transmission operating lever, and at the other end to a control member, such as a vehicle transmission lever for shifting gears.

The remote control assembly 10 includes an adjustment device 18 selectively connected to one of the conduit 12 and the core element 14 for adjusting an effective length thereof. In the non-limiting embodiment shown, the adjustment device 18 adjusts the effective length of the core element 14. Alternatively, this type of adjustment device 18 may be modified for adjusting the effective length of the conduit 12.

Figure 2:
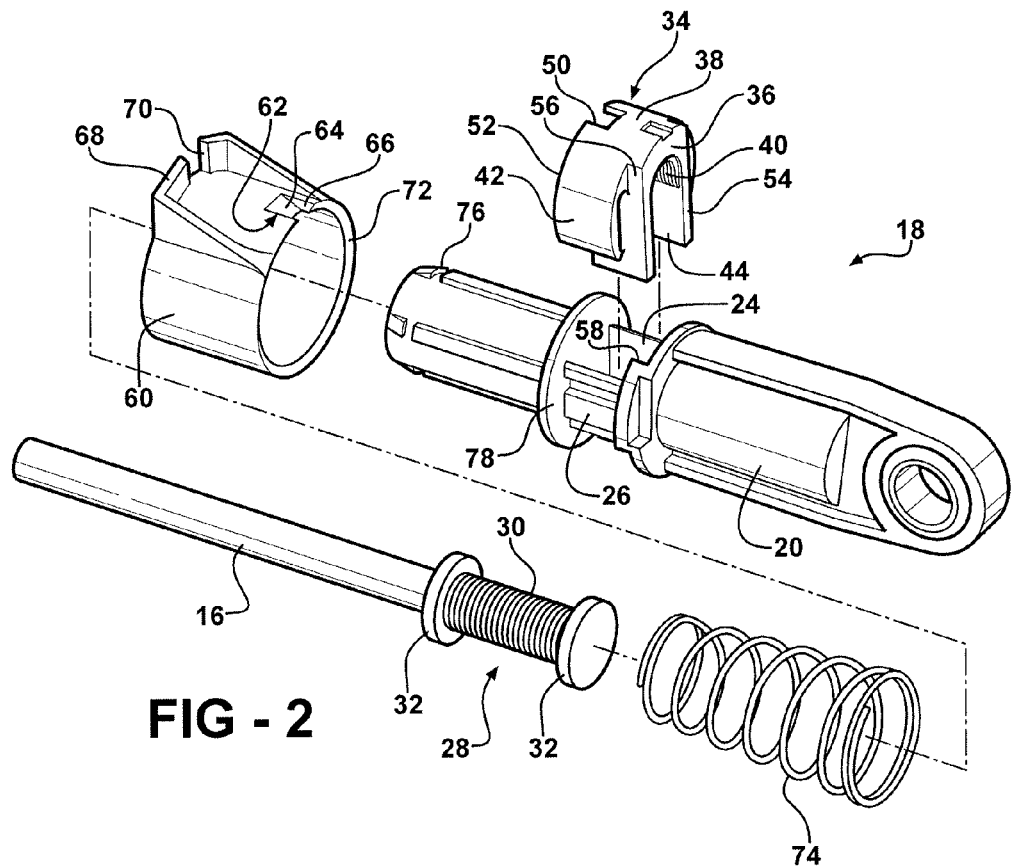
FIG. 2 is an exploded perspective view of the assembly.
Figure 3:
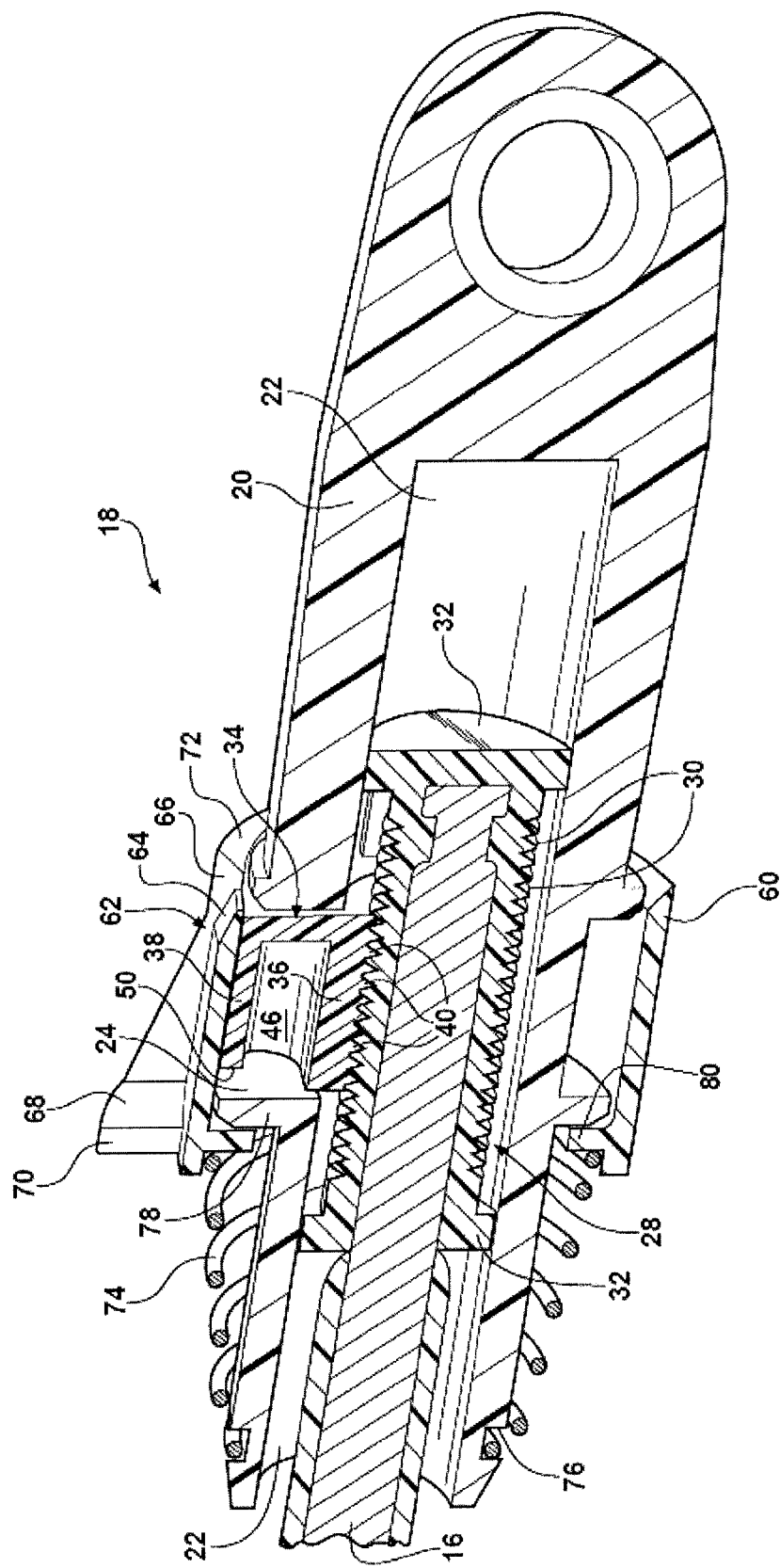
FIG. 3 is a cross-sectional view of the assembly.

Referring also to FIGS. 2 and 3, the adjustment device 18 includes an adjustment housing 20 having a first opening 22 and a second opening 24 intersecting the first opening 22. Preferably, the second opening 24 is transverse to the first opening 22. Even more preferably, the first opening 22 preferably extends along the major length of the remote control assembly 10 and the second opening 24 extends perpendicular to the first opening 22. The first opening 22 may be of any suitable configuration and is illustrated as being circular. A pair of panels 26 are disposed on the housing to define the second opening 24. In this embodiment, the housing 20 is also a terminal for the remote control assembly 10 and is preferably fastened to one of the levers of a vehicle, for example.

The adjustment device 18 also includes a slider 28 having slider teeth 30 slidably disposed in the first opening 22. In the non-limiting embodiment shown, the slider 28 is fixedly mounted to one end of the core element 14. Specifically, the slider 28 is mounted to the rod 16, thereby securing the core element 14 to the slider 28. The adjustment housing 20 surrounds the slider 28 and is axially movable relative to the slider 28 to adjust an overall length of the core element 14. Flanking the slider teeth 30 are a pair of enlarged ends 32. The cross-sectional area of the slider 28 generally conforms to the cross-sectional area of the first opening 22, which in the illustrated embodiment is circular.

The adjustment device 18 further includes a locking element 34 having a body 36 with a top 38 and locking teeth 40 extending toward the second opening 24 away from the top 38 for engaging with the slider teeth 30. The locking element 34 includes a pair of solid arms 42 extending outwardly from the body 36 and a pair of legs 44 extending downwardly from the body 36. A locking tab (not numbered) is disposed on a distal end of each of the arms 42 and the arms 42 are flexible to allow radial movement of the arms 42 relative to the body 36. In between each leg 44 and each corresponding arm 42 is a path such that the locking element 34 defines a pair of substantially parallel paths. One of the panels 26 of the adjustment housing 20 are disposed in each of the paths when the locking element 34 is installed on the housing 20. The locking tabs engage the panels 26 in at least one and preferably two locations to orientate the locking element 34 in the unlocked and locked positions. As such, the locking tabs assist in holding the locking element 34 in the unlocked position and assist in retaining the locking element 34 in the locked position. The locking teeth 40 of the locking element 34 are preferably housed above the legs 44 and are even more preferably configured to match the configuration of the slider teeth 30. In the illustrated embodiment, the locking teeth 40 and slider teeth 30 are arcuate.

Figure 8:
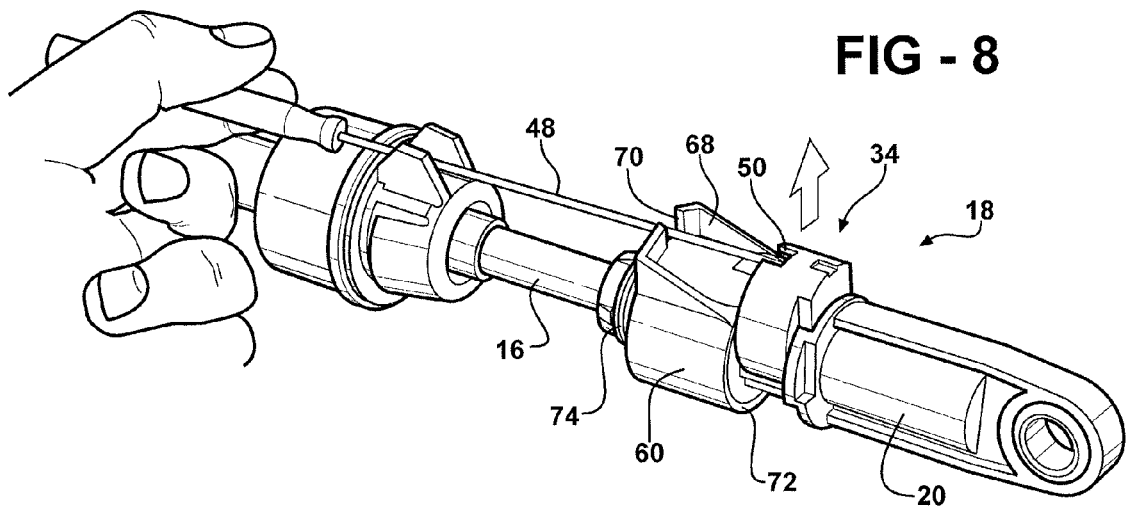
FIG. 8 is a perspective view of the assembly with the locking element in the unlocked position.

The locking element 34 is movably disposed in the second opening 24 between a locked position with the locking teeth 40 engaging the slider teeth 30 (see FIGS. 3-7) and an unlocked position with the locking teeth 40 disengaging the slider teeth 30 (see FIGS. 1 and 8). When the locking element 34 is installed in the second opening 24 in either position, the slider 28 is retained in the first opening 22 as the enlarged ends 32 of the slider 28 engage the legs 44 of the locking element 34.

The locking element 34 preferably defines a cavity 46 between the top 38 and the locking teeth 40 for allowing insertion of a tool 48 (shown in FIGS. 6-8) to facilitate movement of the locking element 34 from the locked position to the unlocked position. Preferably, a notch 50 is formed in the top 38 of the locking element 34 to provide access to the cavity 46. The notch 50 and cavity 46 may be of any suitable shape or configuration. Alternatively, the cavity 46 may be eliminated with only the notch 50 being formed in the locking element 34 for allowing insertion of the tool 48.

The locking element 34 includes a first side 52 and a second side 54 flanking the top 38. The sides 52, 54 are transverse to the arms 42 and define the width of the body 36. Each of the sides 52, 54 are substantially straight and are devoid of any features that would impede the smooth operation of the locking element 34 moving between the locked and unlocked positions. The second opening 24 has a complementary configuration to the sides 52, 54 such that the locking element 34 is movable within the second opening 24 between the locked and unlocked positions without interference from the second opening 24. The locking element 34 can also include a tab 56 extending from at least one of the sides 52, 54 with the first opening 22 having a complementary configured recess 58 for accepting the tab 56. Similarly, the second opening 24 is devoid of any features that would impede the smooth operation of the locking element 34 moving between the locked and unlocked positions. The locking tabs described above are minimized to reduce the resistance to the smooth operation. Alternatively, the locking tabs can be eliminated.

A cover 60 is slidably supported on the housing 20. The cover 60 is movable about the housing 20 between an open position spaced from the second opening 24 (see FIGS. 1, 4 and 6-8) and a closed position extending at least partially over the second opening 24 when the locking element 34 is in the locked position for at least partially covering the locking element 34 (see FIGS. 3 and 5). A detent 62 is preferably formed in the cover 60. Even more preferably, the detent 62 is aligned with the notch 50. If a cavity 46 is provided, this alignment provides further access to the cavity 46. The detent 62 can include a ramp 64 sloping toward the notch 50. In the most preferred embodiment, the detent 62 includes an opening 66 between the ramp 64 and the notch 50.

A handle 68 is formed on the cover 60 with the handle extending outwardly from the cover 60. A slot 70 is formed in the handle 68 with the slot 70 being aligned with the detent 62 and the notch 50. The cover 60 also includes an abutment surface 72 abutting the locking element 34 with the abutment surface 72 being substantially straight such that the locking element 34 is free to move from the unlocked position to the locked position without movement of the cover 60. As with the locking element 34 itself and the second opening 24, the cover 60 is devoid of any features that would impede the smooth operation of the locking element 34 between the locked and unlocked positions.

Figure 4:
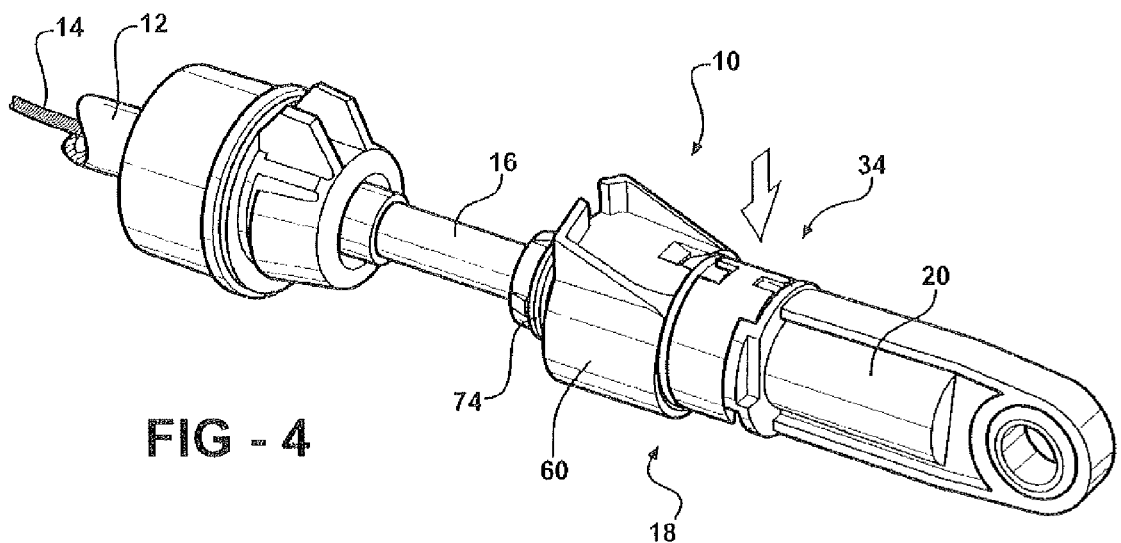
FIG. 4 is a perspective view of the assembly with the locking element in a locked position and the cover is the open position.
Figure 5:
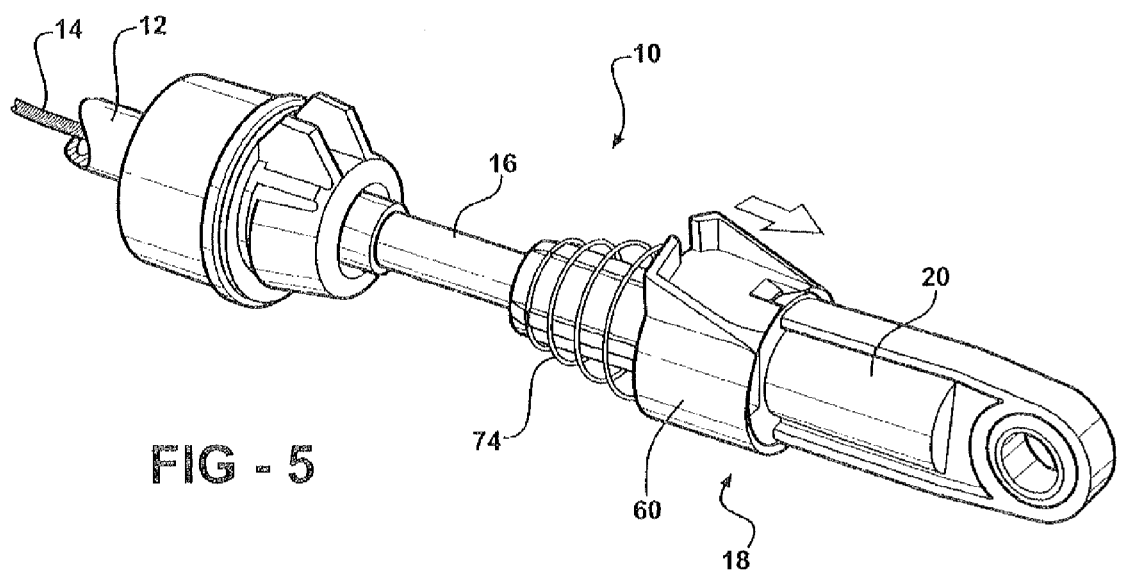
FIG. 5 is a perspective view of the assembly with the locking element in the locked position and the cover in a closed position.

A spring 74 is preferably disposed on the housing 20 for engaging the cover 60. The spring 74 is secured to the housing 20 by a groove 76 in the housing 20 and continuously biases the cover 60 toward the closed position. This biasing can abut the cover 60 with the locking element 34 when the locking element 34 is in the unlocked position, such as shown in FIG. 1. In a rest unlocked state, this abutment defines the open position of the cover 60. Preferably, the spring 74 biases the cover 60 to continuously abut the locking element 34 when the locking element 34 is in the unlocked position to define the open position of the cover 60. In this position, the cover 60 can frictionally retain the locking element 34 in the unlocked position, thereby allowing the locking tabs to be eliminated. The adjustment housing 20 includes a stop 78 and the cover 60 engages the stop 78 when in the closed position to define the closed position of the cover 60, such as shown in FIG. 3. As best shown in FIGS. 4 and 5, preferably the cover 60 automatically moves to the closed position and engages the stop 78 when the locking element 34 moves into the locked position. The cover 60 includes a flange 80 extending radially toward the first opening 22 of the adjustment housing 20 and engages the stop 78 when the cover 60 is in the closed position.

As discussed above, the adjustment housing 20, locking element 34 and cover 60 are configured to allow efficient and unobstructed movement of the locking element 34 from the unlocked position to the locked position (FIG. 4). When the cover 60 automatically moves to the closed position (FIG. 5), the user now has confirmation that the locking element 34 has been correctly and fully moved to the locked position. To assist the user, the locking element 34 and cover 60 may have different appearances, such as different colors.

Figure 6:
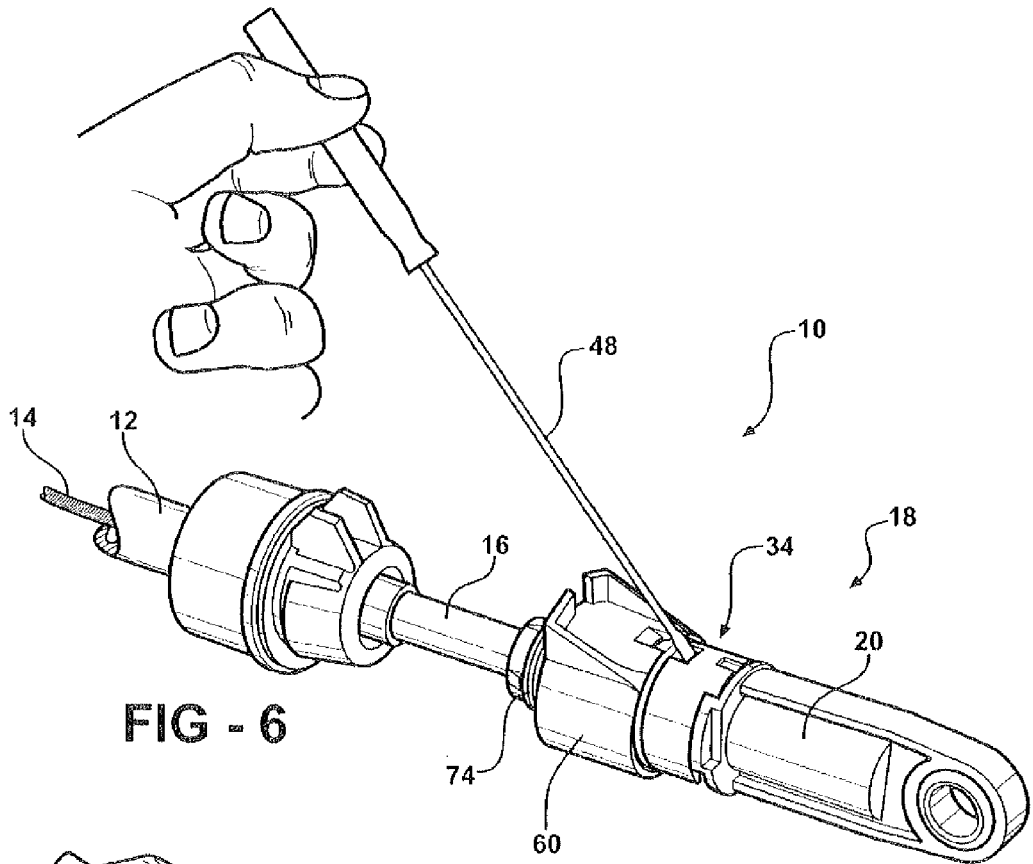
FIG. 6 is a perspective view of the assembly with the cover pulled back to the open position and a tool engaging the locking element.
Figure 7:
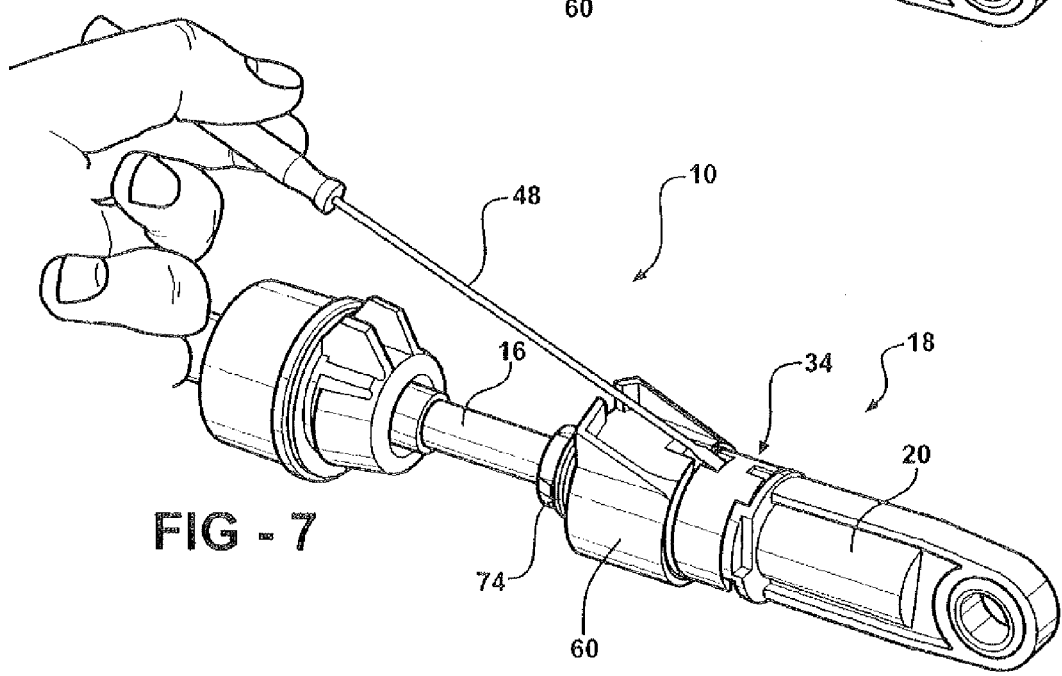
FIG. 7 is a perspective view of the assembly with the tool engaging the locking element and abutting the cover.

As shown in FIGS. 6-8, movement of the locking element 34 from the unlocked position back to the locked position is accomplished by first retracting the cover and then inserting the tool 48, which can be of any suitable configuration, into the notch 50 and/or cavity 46 of the locking element 34 (FIG. 6). The user then leverages the tool 48 toward the adjustment device 18 (FIG. 7). Preferably, the tool 48 is leveraged against the detent 62 in the cover 60. Further leveraging of the tool 48 toward the adjustment device 18 returns the locking element 34 to the unlocked position (FIG. 8). Preferably, the tool 48 falls within the slot 70 in the handle 68 of the cover 60 during this portion of the removal procedure. The adjustment device 18 may now be re-adjusted as necessary.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A motion transmitting remote control assembly for transmitting motion along a path, said assembly comprising:
   a conduit;
   a motion-transmitting core element slidably disposed in said conduit;
   an adjustment device selectively connected to one of said conduit and said core element for adjusting an effective length thereof, said adjustment device including:
      an adjustment housing having a first opening and a second opening intersecting said first opening;
      a slider having slider teeth slidably disposed in said first opening;
      a locking element having a body with a top, an end wall, an intermediate wall and locking teeth spaced from said top, said intermediate wall having first and second ends defining a thickness of said locking element, said locking teeth being disposed on one side of said intermediate wall and extending toward said slider for engaging with said slider teeth, said locking element movably disposed in said second opening between a locked position with said locking teeth engaging said slider teeth and an unlocked position with said locking teeth disengaging said slider teeth; and
      said locking element defining a notch formed in said top with said end wall secured to said first end of said intermediate wall and interconnecting said top to said intermediate wall to space said top from said intermediate wall and to define a cavity between said top and said locking teeth with said cavity extending across a majority of said locking element between said end wall and said second end of said intermediate wall, said notch providing access to said cavity for allowing insertion of a tool to facilitate movement of said locking element from said locked position to said unlocked position;
   a cover slidably supported on said housing with said cover movable along said housing between an open position spaced from said second opening and a closed position extending at least partially over said second opening when said locking element is in said locked position for at least partially covering said locking element;
   a detent formed in said cover aligned with said notch to further provide access to said cavity;
   a handle formed on said cover with said handle extending outwardly from said cover; and
   a slot formed in said handle with said slot being aligned with said detent and said notch.

2. An assembly as set forth in claim 1 wherein said locking teeth are continuously disposed on said intermediate wall between said first and second ends.

3. An assembly as set forth in claim 1 wherein said conduit defines a longitudinal axis and said motion-transmitting core element slides within said conduit along said longitudinal axis, with said cavity extending across said majority of said locking element between said first and second ends along said longitudinal axis.

4. An assembly as set forth in claim 1 wherein said detent includes a ramp sloping toward said notch.

5. An assembly as set forth in claim 4 wherein said detent includes an opening between said ramp and said notch.

6. An assembly as set forth in claim 1 wherein said cover includes an abutment surface abutting said locking element with said abutment surface being substantially straight such that said locking element is free to move from said unlocked position to said locked position without movement of said cover.

7. An assembly as set forth in claim 1 wherein said locking element includes a first side and a second side flanking said top with each of said sides being substantially straight and said second opening having a complementary configuration to said sides such that said locking element is movable within said second opening between said locked and unlocked positions without interference from said second opening.

8. An assembly as set forth in claim 7 wherein said locking element includes a tab extending from at least one of said sides and said first opening includes a complementary configured recess for accepting said tab.

9. An assembly as set forth in claim 1 wherein said slider is fixedly mounted to said core element with said adjustment housing surrounding said slider and being axially moveable relative to said slider to adjust an overall length of said core element.

10. A motion transmitting remote control assembly for transmitting motion along a path, said assembly comprising:
    a conduit;
    a motion-transmitting core element slidably disposed in said conduit;

an adjustment device selectively connected to one of said conduit and said core element for adjusting an effective length thereof, said adjustment device including:
- an adjustment housing having a first opening and a second opening intersecting said first opening;
- a slider having slider teeth slidably disposed in said first opening;
- a locking element having a body with a top and locking teeth extending toward said slider for engaging with said slider teeth, said locking element movably disposed in said second opening between a locked position with said locking teeth engaging said slider teeth and an unlocked position with said locking teeth disengaging said slider teeth;
- a cover slidably supported on said housing with said cover movable relative to said housing along an axis between an open position spaced from said second opening and a closed position extending at least partially over said second opening when said locking element is in said locked position for at least partially covering said locking element;
- a notch formed in said top of said locking element and a detent formed in said cover aligned with said notch for allowing insertion of a tool to facilitate movement of said locking element from said locked position to said unlocked position; and
- a handle formed on said cover with said handle extending outwardly from said cover transversely to said axis and said handle defining a slot being aligned with said detent and said notch.

11. An assembly as set forth in claim 10 wherein said detent includes a ramp sloping toward said notch.

12. An assembly as set forth in claim 11 wherein said detent includes an opening between said ramp and said notch.

13. An assembly as set forth in claim 10 wherein said locking element defines a cavity between said top and said locking teeth with said notch providing access to said cavity for further facilitating movement of said locking element from said locked position to said unlocked position.

14. An assembly as set forth in claim 10 wherein said locking element includes a first side and a second side flanking said top with each of said sides being substantially straight and said second opening having a complementary configuration to said sides such that said locking element is movable within said second opening between said locked and unlocked positions without interference from said second opening.

15. An assembly as set forth in claim 14 wherein said cover includes an abutment surface abutting said locking element with said abutment surface being substantially straight such that said locking element is free to move from said unlocked position to said locked position without movement of said cover.

16. An assembly as set forth in claim 15 further including a spring disposed on said housing for continuously biasing said cover toward said closed position with said cover continuously abutting said locking element when said locking element is in said unlocked position and said cover automatically moving to said closed position when said locking element moves into said locked position.

17. A motion transmitting remote control assembly for transmitting motion along a path, said assembly comprising:
- a conduit;
- a motion-transmitting core element slidably disposed in said conduit;
- an adjustment device selectively connected to one of said conduit and said core element for adjusting an effective length thereof, said adjustment device including:
  - an adjustment housing having a first opening and a second opening intersecting said first opening with said adjustment housing including a stop extending radially away from said first opening;
  - a slider having slider teeth slidably disposed in said first opening; and
  - a locking element having a body with a top surface, a pair of legs extending from said body, and locking teeth extending toward said slider for engaging with said slider teeth, said locking element movably disposed in said second opening between a locked position with said locking teeth engaging said slider teeth and an unlocked position with said locking teeth disengaging said slider teeth;
- a cover slidably supported on said housing and movable along said housing between an open position spaced from said second opening and a closed position extending at least partially over said second opening when said locking element is in said locked position for at least partially covering said locking element such that said cover engages said stop of said adjustment housing; and
- a biasing member disposed on said housing and engaging said cover for continuously biasing said cover toward said closed position with said cover including an abutment surface abutting said locking element when said locking element is in said unlocked position and said cover automatically moving to said closed position when said locking element moves into said locked position;
- said locking element including a flat face extending from said top surface along said pair of legs with said flat surface continuously sliding along said abutment surface during said movement of said locking element from said unlocked position toward said locked position.

18. An assembly as set forth in claim 17 wherein said cover includes a flange extending radially toward said first opening of said adjustment housing and engaging said stop when said cover is in said closed position.

19. An assembly as set forth in claim 17 wherein said abutment surface is substantially straight such that said locking element is free to move from said unlocked position to said locked position without movement of said cover.

20. An assembly as set forth in claim 17 wherein said locking element defines a notch formed in said top and defines a cavity spaced from said notch between said top and said locking teeth, said assembly further including a detent formed in said cover aligned with said notch to provide access to said cavity.

* * * * *